(12) United States Patent
Nakano (10) Patent No.: US 6,836,668 B1
(45) Date of Patent: Dec. 28, 2004

(54) PORTABLE COMMUNICATION APPARATUS WITH VOICE/CHARACTER CONVERSION DIRECTION SWITCH

(75) Inventor: Motoo Nakano, Shizuoka (JP)

(73) Assignee: NEC Corporation, Tokyo (JP)

( * ) Notice: Subject to any disclaimer, the term of this patent is extended or adjusted under 35 U.S.C. 154(b) by 839 days.

(21) Appl. No.: 09/654,535

(22) Filed: Sep. 1, 2000

(30) Foreign Application Priority Data

Sep. 1, 1999 (JP) .......................................... 11-246846

(51) Int. Cl.$^7$ .............................................. H04M 1/00
(52) U.S. Cl. .................... 455/466; 455/563; 455/550.1; 704/271; 704/270.1; 379/88.13
(58) Field of Search ................... 455/466, 563, 455/566, 550.1, 552.1, 553.1, 412.1; 704/271, 260, 235, 270.1, 275; 379/52, 88.14, 88.13, 93.09

(56) References Cited

U.S. PATENT DOCUMENTS

| | | | |
|---|---|---|---|
| 5,724,410 A | * | 3/1998 | Parvulescu et al. ...... 379/88.18 |
| 5,987,405 A | * | 11/1999 | Bantz et al. ................. 704/220 |
| 5,995,590 A | * | 11/1999 | Brunet et al. .................. 379/52 |

FOREIGN PATENT DOCUMENTS

| | | |
|---|---|---|
| JP | 5-22436 | 1/1993 |
| JP | 5-130177 | 5/1993 |
| JP | 8-186654 | 7/1996 |
| JP | 9-116648 | 5/1997 |
| JP | 9-233215 | 9/1997 |
| JP | 11-41344 | 2/1999 |
| JP | 11-168552 | 6/1999 |

OTHER PUBLICATIONS

Copy of Japanese Office Action dated Dec. 3, 2002.
Copy of English translation of Japanese Office Action dated Dec. 3, 2002.

* cited by examiner

Primary Examiner—Nick Corsaro
(74) Attorney, Agent, or Firm—Dickstein, Shapiro, Morin & Oshinsky, L.L.P.

(57) ABSTRACT

A portable communication apparatus allowing increased flexibility and convenience is disclosed. A switch is provided to select one of a voice-character conversion communication mode and a character-voice conversion communication mode depending on a setting instruction. A voice-character converter performs a selected one of a first conversion from voice to character data and a second conversion from character to voice data according to the selected communication mode.

5 Claims, 7 Drawing Sheets

PORTABLE COMMUNICATION APPARATUS WITH VOICE/CHARACTER CONVERSION DIRECTION SWITCH

BACKGROUND OF THE INVENTION

1. Field of the Invention

The present invention generally relates to a portable communication apparatus such as a portable or mobile telephone terminal, and in particular to a voice-character conversion technique for use in the portable communication apparatus.

2. Description of the Related Art

There has been proposed a portable communication apparatus having a voice-to-character conversion receiving section and a character-to-voice conversion transmitting section in Japanese Patent Application Unexamined Publication No. 9-116648. More specifically, in the voice-to-character conversion receiving section, a voice recognizer recognizes voice words from voice signals received from the opposite party through a communication line and a voice-to-character converter converts the recognized voice words to character data, which are displayed on a display of the terminal. In the character-to-voice conversion transmitting section, a voice synthesizer inputs character data and generates corresponding voice data and a converter converts voice data to voice signals to be transmitted to the opposite party through the communication line.

However, in this conventional portable communication apparatus, a data transmission/reception route is fixed such that voice-to-character conversion is performed when receiving and character-to-voice conversion is performed when transmitting. Therefore, for example, voice-to-character conversion cannot be performed when transmitting. This provides a portable communication apparatus with little flexibility.

Further, when character data is received and displayed on screen, the called user creates a message and it is converted to voice data and then transmitted. Therefore, there is developed a time difference from when the opposite party transmits a message to when receiving a voice response to the message.

SUMMARY OF THE INVENTION

An object of the present invention is to provide a portable communication apparatus and a voice-character conversion method allowing increased flexibility in transmission and reception.

Another object of the present invention is to provide a portable communication apparatus and a voice-character conversion method allowing quick response with simplified operation.

According to the present invention, a portable communication apparatus for transmitting and receiving a voice message and a character message to and from a base station in a mobile communications system, includes: a switch for selecting one of a first communication mode and a second communication mode depending on a setting instruction; and a voice-character converter for performing a selected one of a first conversion from voice to character data and a second conversion from character to voice data according to the selected communication mode.

The first communication mode may be such that a voice message received from the base station is converted into character data and a character message to be transmitted is converted into voice data. The second communication mode may be such that a character message received from the base station is converted into voice data and a voice message to be transmitted is converted into character data. The voice-character converter may perform a selected one of the first conversion and the second conversion depending on which of transmission and reception is performed in the selected communication mode.

The portable communication apparatus further includes: a memory for previously storing at least one response character message; and a controller controlling such that a response character message is read out from the memory depending on an instruction and the voice-character converter performs the second conversion on the response character message.

The switch may further select a non-conversion communication mode depending on the setting instruction, wherein the non-conversion communication mode is such that neither a voice message nor a character message is converted.

A portable communication apparatus includes: a radio system for transmitting and receiving a voice message and a character message to and from a base station in a mobile communications system; a voice data processor for voice input and output; a character data processor for character data input and output; a first converter for converting voice data to character data; a second converter for converting character data to voice data; a first switch for selecting one of the first converter and the second converter to connect it to the radio system; a second switch for selecting one of the voice data processor and the character data processor to connect it to the selected one of the first converter and the second converter, depending on which of a first communication mode and a second communication mode is selected, wherein the first communication mode is such that a voice message received from the base station is converted into character data and a character message to be transmitted is converted into voice data, and the second communication mode is such that a character message received from the base station is converted into voice data and a voice message to be transmitted is converted into character data; and a controller controlling such that the first switch selects one of the first converter and the second converter depending on which of transmission and reception is performed in the selected one of the first communication mode and the second communication mode.

When the first communication mode is selected, the controller may control the first switch such that the first converter is selected when a voice message is received by the radio system and the second converter is selected when a character message to be transmitted is input from the character data processor.

Alternatively, when the second communication mode is selected, the controller may control the first switch such that the second converter is selected when a character message is received by the radio system and the first converter is selected when a voice message to be transmitted is input from the voice data processor.

According to another aspect of the present invention, a portable communication apparatus includes: a voice-character converter for performing two-directional conversion switching between a first direction from voice to character data and a second direction from character to voice data; and a controller for controlling the voice-character converter such that an operation mode of switching between the first and second directions is determined depending on which of a first communication mode and a second communication mode is selected.

As described above, according to the present invention, a voice/character conversion direction can be changed by its user, resulting in enhanced convenience to subscribers. Especially, improved communicability between the handicapped and the able-bodied as if to talk by telephone can be achieved.

Further, using the response message memory, a prompt reply of a fixed message can be made during communication, allowing easy input operation and improved convenience. Since a reply message can be sent immediately after a voice or character message has been received, the communication can be made in a form similar to telephone communication.

DETAILED DESCRIPTION OF THE PREFERRED EMBODIMENTS

Hereafter, a portable communication apparatus according to preferred embodiments of the present invention (here, a portable telephone terminal) will be described in detail.

FIRST EMBODIMENT

Figure 1:
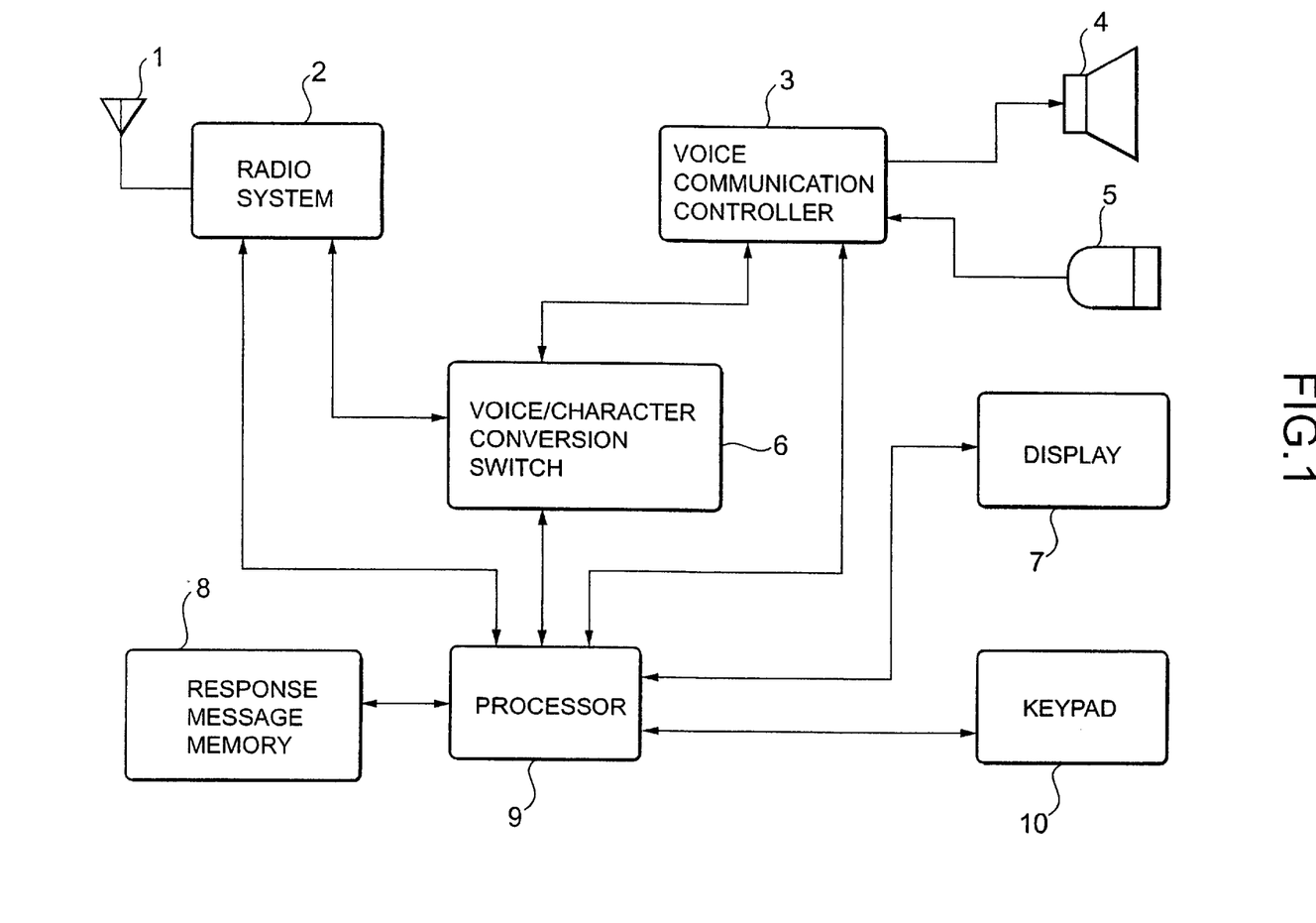
FIG. 1 is a block diagram showing a portable communication apparatus according to a first embodiment of the present invention.

Referring to FIG. 1, a portable telephone terminal includes a radio system 2 connected to an antenna 1 and a voice communication controller 3 connected to a speaker 4 and a microphone 5. A voice/character conversion switch 6 is connected to the radio system 2, the voice communication controller 3, and a processor 9. The processor 9 is connected to a display 7, a response message memory 8, and an input operation section (here, a keypad) 10.

The radio system 2 includes a frequency converter, a modulator/demodulator (modem), an encoder/decoder (codec) and other necessary circuits. When receiving a radio signal from a base station (not shown) through the antenna 1, the radio system 2 outputs control information to the processor 9 and voice/character data to the voice/character conversion switch 6. In transmission operation, the radio system 2 inputs voice/character data from the voice/character conversion switch 6 and performs encoding and modulating to produce a radio transmission signal, which is transmitted to a base station through the antenna 1.

The voice communication controller 3 includes a speech codec, by which reception voice data input from the voice/character conversion switch 6 is converted into a reception audio signal and a transmission audio signal input from the microphone 5 is converted to transmission voice data. The reception audio signal is converted to sounds by the speaker 4. The transmission voice data is output to the voice/character conversion switch 6.

The response message memory 8 stores response messages of character data, which has been created by a user. Under control of the processor 9, a user-selected message is read out from the response message memory 8 and is output to the voice/character conversion switch 6.

The processor 9 is a program-controlled processor such as a microprocessor or a CPU, which controls the entire operations of the portable telephone terminal, including protocol control and user interface control. The keypad 10 is used to input setting data, make a call, take a call or perform other necessary operations.

VOICE/CHARACTER CONVERSION SWITCH

The voice/character conversion switch 6 is set to one of non-conversion (voice-to-voice conversion) communication mode, voice-character communication mode, and character-voice communication mode to provide a communication route under control of the processor 9. The details of the voice/character conversion switch 6 will be described hereafter.

Figure 2:
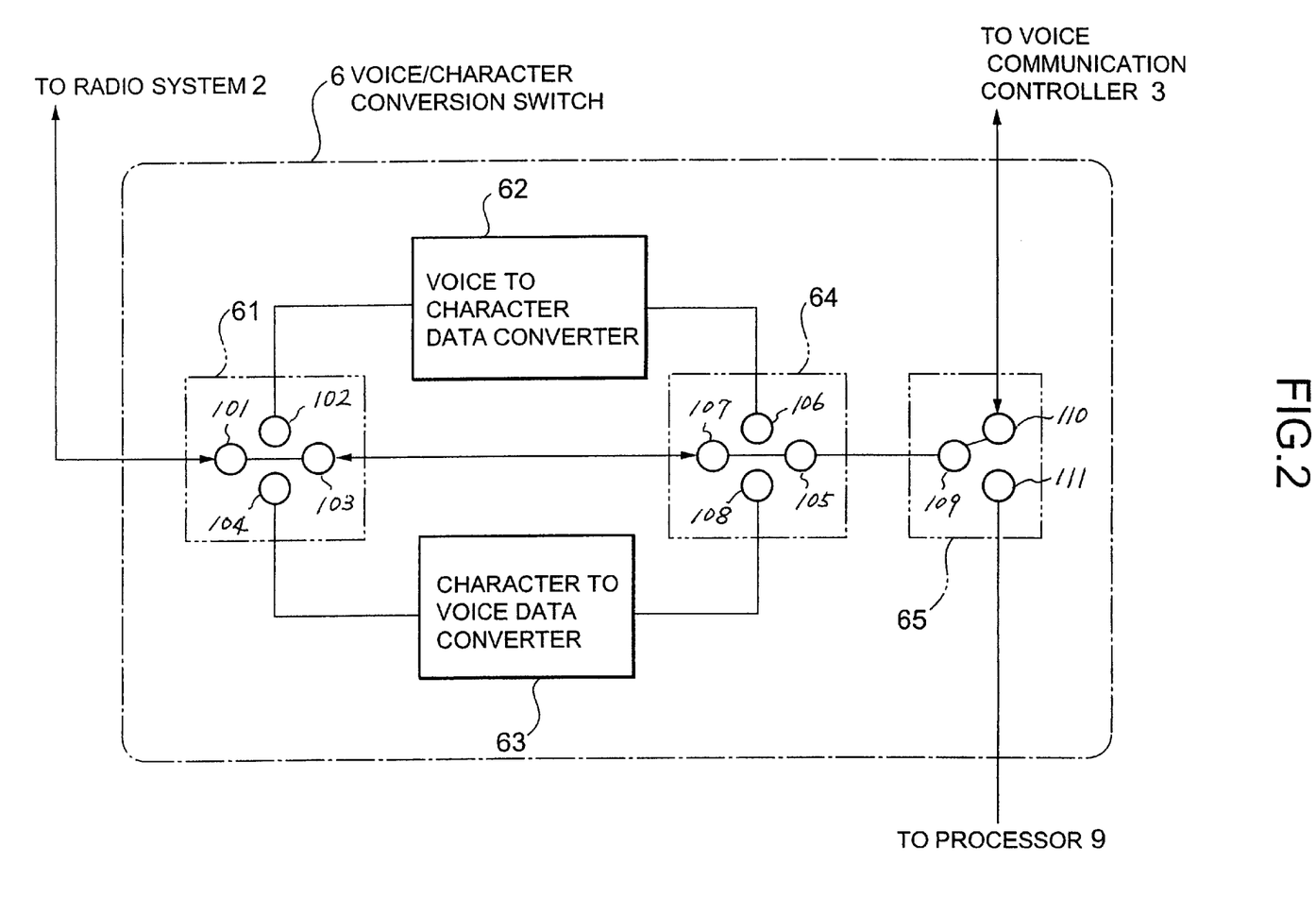
FIG. 2 is a block diagram showing a voice/character conversion switch set to no-conversion state in the first embodiment of the present invention.

Referring to FIG. 2, the voice/character conversion switch 6 is composed of the following functional blocks: a voice-to-character data converter 62, a character-to-voice data converter 63, and route switches 61, 64 and 65.

The route switch 61 has a common port 101 and three selectable ports 102–104, which are operable such that the common port 101 is selectively connected to one of the selectable ports 102–104 under control of the processor 9. The route switch 64 has a common port 105 and three selectable ports 106–108, which are operable such that the common port 105 is selectively connected to one of the selectable ports 106–108 under control of the processor 9. The route switch 65 has a common port 109 and two selectable ports 110 and 111, which are operable such that the common port 109 is selectively connected to one of the selectable ports 110–111 under control of the processor 9.

In the route switch 61, the common port 101 is connected to the radio system 2, and the selectable ports 102, 103, and 104 are connected to one port of the voice-to-character data converter 62, the selectable port 107 of the route switch 64, and one port of the character-to-voice data converter 63, respectively.

In the route switch 64, the common port 105 is connected to the common port 109 of the route switch 65, and the selectable ports 106, 107, and 108 are connected to the other port of the voice-to-character data converter 62, the selectable port 103 of the route switch 61, and the other port of the character-to-voice data converter 63, respectively.

In the route switch 65, the common port 109 is connected to the common port 105 of the route switch 64 and the selectable ports 110 and 111 are connected to the voice communication controller 3 and the processor 9, respectively.

The voice/character conversion switch 6 may be implemented by a program running on a program-controlled processor.

OPERATION

First, the user uses the keypad 10 to select one of the conversion communication mode, the voice-character communication mode, and the character-voice communication mode, which causes the processor 9 to set the voice/character conversion switch 6 to the user-selected communication mode. The details will be described later with reference to FIGS. 2–4.

Non-Conversion Communication Mode

FIG. 2 shows the non-conversion state of the voice/character conversion switch 6. When the non-conversion communication route is selected, the voice/character conversion switch 6 is controlled by the processor 9 such that the route switches 61, 64, and 65 connect the radio system 2 directly to the voice communication controller 3. More specifically, the route switch 61 is set such that the common port 101 is connected to the selectable port 103 and the route switch 64 is set such that the common port 105 is connected to the selectable port 107. The route switch 65 is set such that the common port 109 is connected to the selectable port 110.

In the non-conversion state of the voice/character conversion switch 6, received voice data is transferred as it is from the radio system 2 to the voice communication controller 3 through the voice/character conversion switch 6 and transmission voice data is transferred as it is from the voice communication controller 3 to the radio system 2 through the voice/character conversion switch 6. Accordingly, an ordinary telephone communication is performed.

Voice-Character Communication Mode

Figure 3:
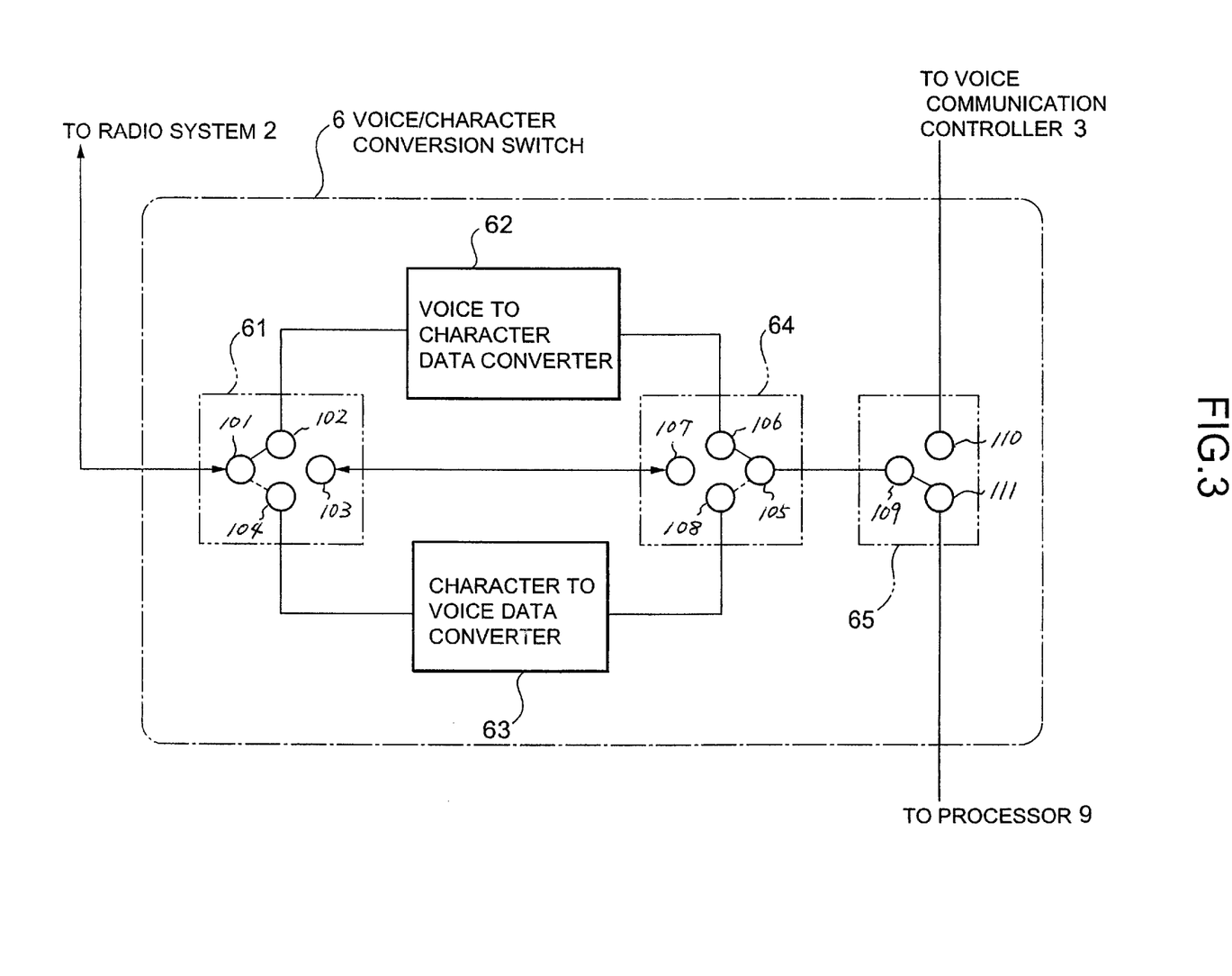
FIG. 3 is a block diagram showing the voice/character conversion switch set to a voice-character conversion state in the first embodiment of the present invention.

FIG. 3 shows the voice-character communication state of the voice/character conversion switch 6. When the voice-character communication route is selected, the voice/character conversion switch 6 is controlled by the processor 9 such that the route switches 61, 64, and 65 connect the radio system 2 to the processor 9 through a selected one of the voice-to-character data converter 62 and the character-to-voice data converter 63 depending on which of transmission and reception is performed.

More specifically, when the radio system 2 receives a radio voice signal, the route switch 61 is set such that the common port 101 is connected to the selectable port 102 and the route switch 64 is set such that the common port 105 is connected to the selectable port 106. The route switch 65 is set such that the common port 109 is connected to the selectable port 111. In this state (receive-conversion route), received voice data is transferred from the radio system 2 to the voice-to-character data converter 62, by which the received voice data is converted to character data and then the received character data is transferred to the processor 9 through route switches 64 and 65. When receiving the received character data, the processor 9 controls the display 7 so that the received characters are displayed on the display 7. In other words, the transmission voice of the opposite party is displayed in form of character at the receiving terminal.

Contrarily, when character data is transmitted, the route switch 61 is set such that the common port 101 is connected to the selectable port 104 (as indicated by dashed lines) and the route switch 64 is set such that the common port 105 is connected to the selectable port 108 (as indicated by dashed lines). The route switch 65 is kept in the previous state such that the common port 109 is connected to the selectable port 111. In this state (transmit-conversion route), transmission character data input from the processor 9 is transferred to the character-to-voice data converter 63 through the route switches 65 and 64. The transmission character data is converted to voice data by the character-to-voice data converter 63 and then the transmission voice data is transferred to the radio system 2 through the route switch 61. The radio system 2 converts the transmission voice data into a radio transmission voice signal and transmits it to a base station through the antenna 1. In other words, the transmission character data is transmitted as voice data to the opposite party.

Character-Voice Communication Mode

Figure 4:
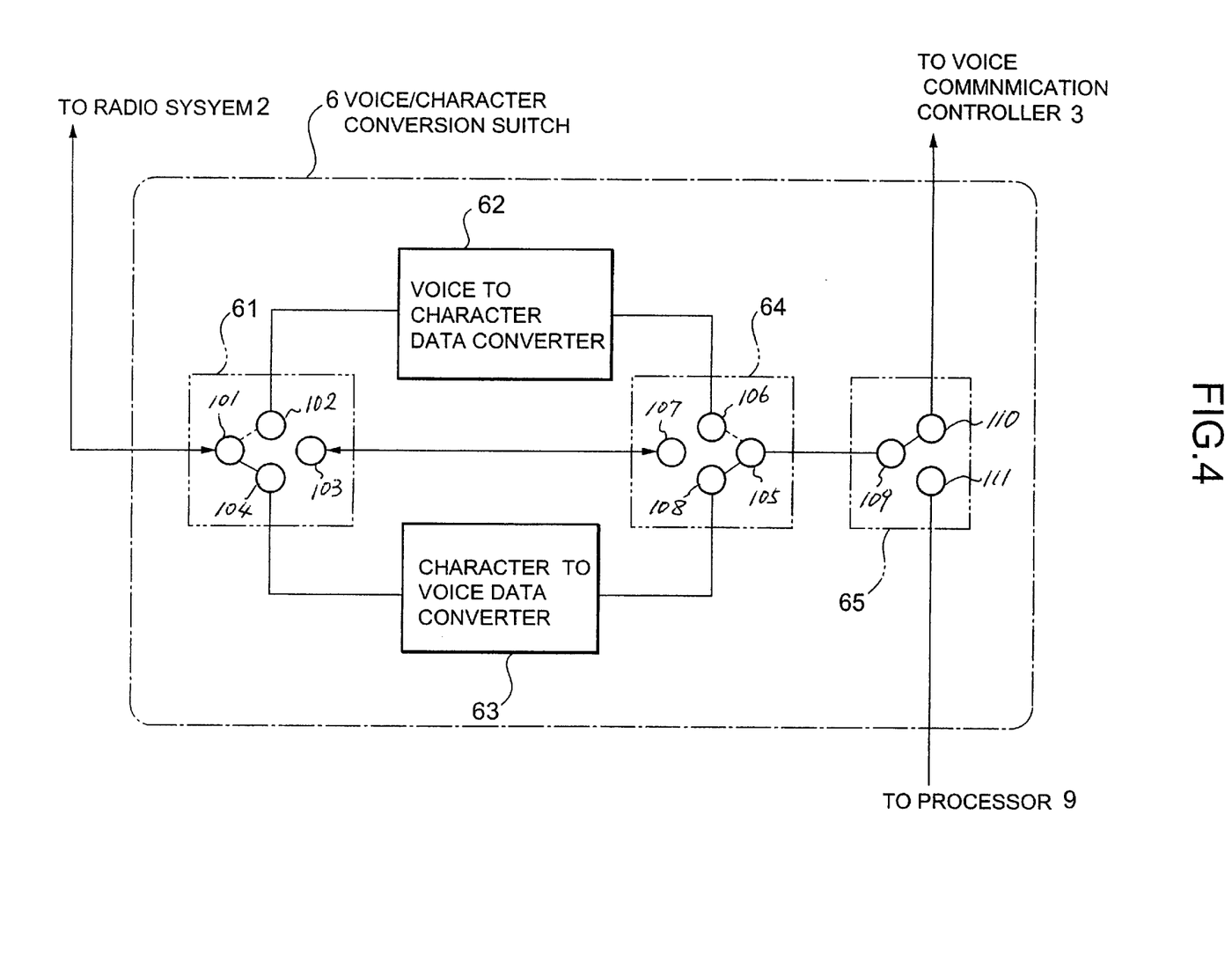
FIG. 4 is a block diagram showing the voice/character conversion switch set to a character-voice conversion state in the first embodiment of the present invention.

FIG. 4 shows the character-voice communication state of the voice/character conversion switch 6. When the character-voice communication route is selected, the voice/character conversion switch 6 is controlled by the processor 9 such that the route switches 61, 64, and 65 connect the radio system 2 to the processor 9 through a selected one of the voice-to-character data converter 62 and the character-to-voice data converter 63 depending on which of transmission and reception is performed.

More specifically, when the radio system 2 receives a radio character signal, the route switch 61 is set such that the common port 101 is connected to the selectable port 104 and the route switch 64 is set such that the common port 105 is connected to the selectable port 108. The route switch 65 is set such that the common port 109 is connected to the selectable port 110. In this state (receive-conversion route), received character data is transferred from the radio system 2 to the character-to-voice data converter 63, by which the received character data is converted to voice data and then the received voice data is transferred to the voice communication controller 3 through route switches 64 and 65. The voice communication controller 3 drives the speaker 4 according to the received voice data to produce voice. In other words, the transmission characters of the opposite party are reproduced in voice form at the receiving terminal.

Contrarily, when voice data is transmitted, the route switch 61 is set such that the common port 101 is connected to the selectable port 102 (as indicated by dashed lines) and the route switch 64 is set such that the common port 105 is connected to the selectable port 106 (as indicated by dashed lines). The route switch 65 is kept in the previous state such that the common port 109 is connected to the selectable port 110. In this state (transmit-conversion route), transmission voice data input from the voice communication controller 3 is transferred to the voice-to-character data converter 62 through the route switches 65 and 64. The transmission voice data is converted to character data by the voice-to-character data converter 62 and then the transmission character data is transferred to the radio system 2 through the route switch 61. The radio system 2 converts the transmission character data into a radio transmission character signal and transmits it to a base station through the antenna 1. In other words, the transmission voice data is transmitted as character data to the opposite party.

VOICE/CHARACTER CONVERSION OPERATION

A voice/character conversion operation is performed by the processor 9, the voice communication controller 3, and the voice/character conversion switch 6 executing a program stored in a read-only memory or IC memory.

Figure 5:
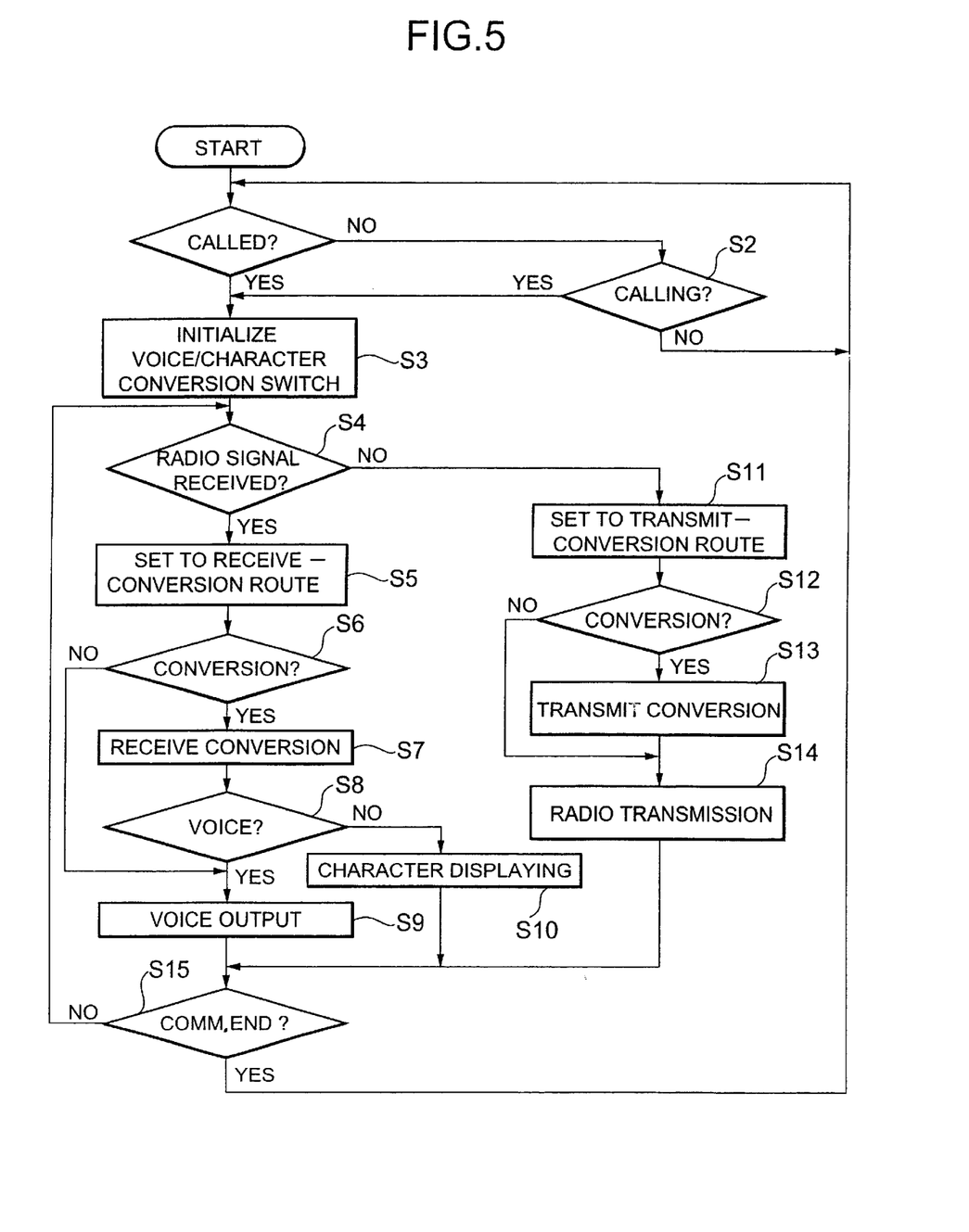
FIG. 5 is a flow chart showing a character/voice conversion operation according to the first embodiment of the present invention.

Referring to FIG. 5, the processor 9 determines whether an incoming call occurs (step S1) and whether an outgoing call occurs (step S2). When an incoming call or an outgoing call occurs (YES in steps S1 and S2), the processor 9 initializes the voice/character conversion switch 6 (step S3) and determines whether a radio signal is received (step S4).

When a radio signal has been received by the radio system 2 (YES in step S4), the voice/character conversion switch 6 is set to a receive-conversion route of the previously user-selected communication mode as described before (step S5).

Thereafter, it is determined whether a conversion operation is needed (step S6) and, when needed (YES in step S6), the conversion is performed depending on the user-selected communication mode as described before (step S7) and then it is determined whether the converted data is voice data (step S8). If it is voice data (YES in step S8), then the received voice data is transferred from the voice/character conversion switch 6 to the voice communication controller 3, which performs voice output processing (step S9). If converted data is not voice data, that is, character data (NO in step S8), the character data is transferred from the voice/character conversion switch 6 to the processor 9, which performs display processing of the character data as described before (step S10). When a conversion operation is not needed (NO in step S6), the received voice data is transferred directly to the voice communication controller 3, which performs voice output processing (step S9).

On the other hand, when transmission data is input (NO in step S4), the voice/character conversion switch 6 is set to a transmit-conversion route of the previously user-selected communication mode as described before (step S11). Thereafter, it is determined whether a conversion operation is needed (step S12) and, when needed (YES in step S12), the conversion is performed depending on the user-selected communication mode as described before (step S13). Then, the converted data is output to the radio system 2, which performs radio transmission (step S14). When a conversion operation is not needed (NO in step S12), the transmission voice data is transferred directly from the voice communication controller 3 to the radio system 2 and then the transmission voice data is output to the radio system 2, which performs radio transmission (step S14).

The processor 9 determines whether the communication has been completed (step S15). If not completed (NO in step S15), then the above steps S4 through S9 or S11 through S14 are repeatedly performed until the communication has been completed. When the communication has been completed (YES in step S15), the control goes back to the step S1.

RESPONSE MESSAGE TRANSMISSION

A response message transmission operation is performed by the processor 9 executing a program stored in a read-only memory or IC memory.

Figure 6:
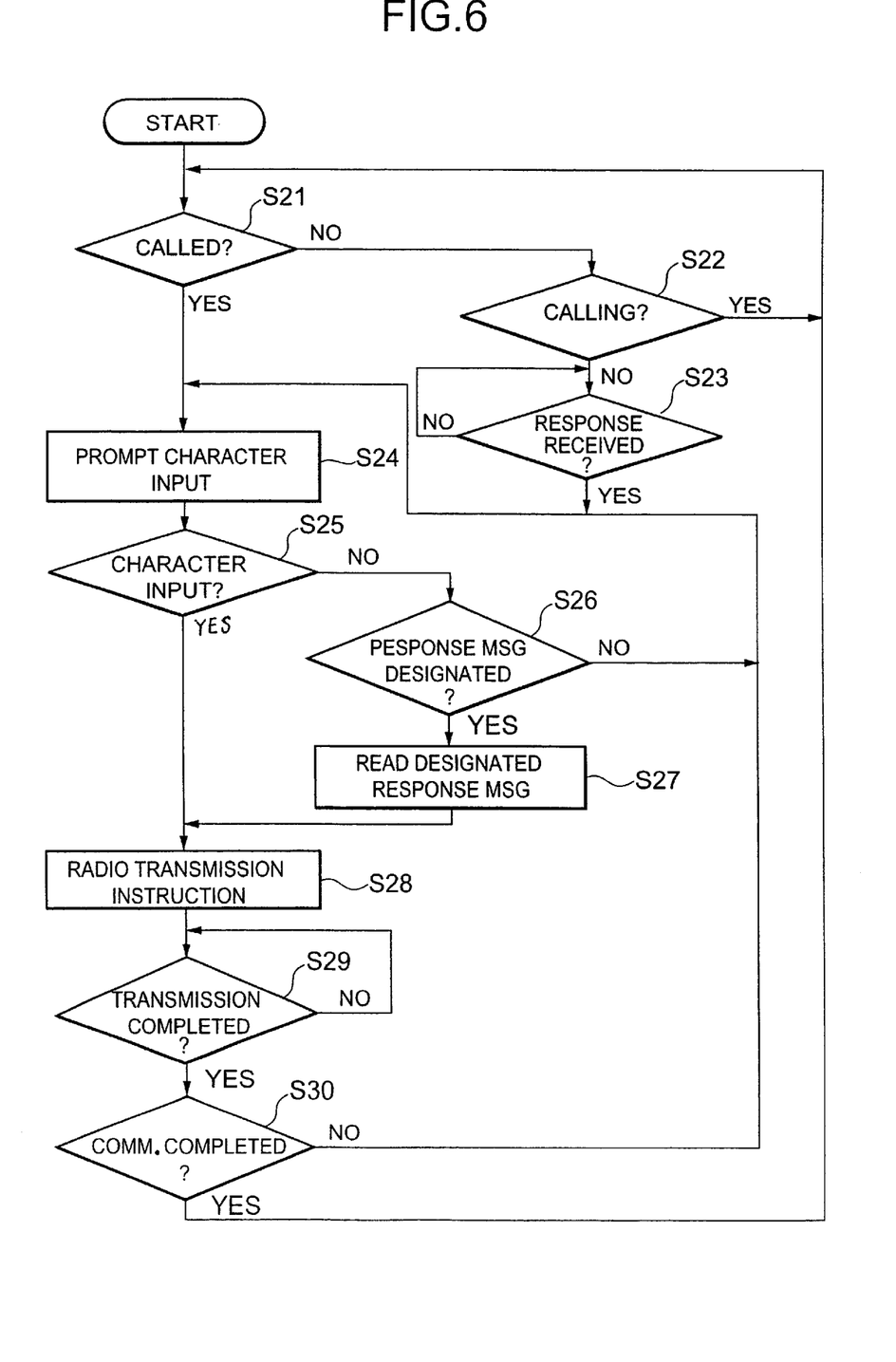
FIG. 6 is a flow chart showing a transmission operation of a response message according to the first embodiment of the present invention.

Referring to FIG. 6, the processor 9 determines whether an incoming call occurs (step S21) and, if no incoming call (NO in step S21), then further determines whether an outgoing call occurs (step S22). When no outgoing call occurs (NO in step S22), the processor 9 determines whether a response is received from an opposite party (step S23). When an incoming call occurs (YES in step S21) or when a response is received from an opposite party (YES in step S23), the processor 9 prompts the user by, for example, cursor blinking on the display, to input a message to be sent back (step S24). Then, the processor 9 determines whether any character is input by the user or one of the response messages stored in the response message memory 8 is designated by the user (steps S25 and S26).

When a set of characters as a transmission message is input (YES in step S25), the processor 9 instructs the voice/character conversion switch 6 and the radio system 2 to transmit the transmission character data (step S28). On the other hand, when one of the response messages is designated by the user (YES in step S26), the processor 9 reads out the designated response message from the response message memory 8 (step S27). Then, the processor 9 instructs the voice/character conversion switch 6 and the radio system 2 to transmit the response message character data (step S28). After the transmission operation has been completed (YES in step S29), it is determine whether the communication is completed (step S30). When the communication is not completed (NO in step S30), the control goes back to the step S24 and the steps S24 through S29 are repeatedly performed until the communication has been completed. If the communication is completed (YES in step S30), the control goes back to the step S21 to wait for occurrence of incoming or outgoing call.

SECOND EMBODIMENT

Figure 7:
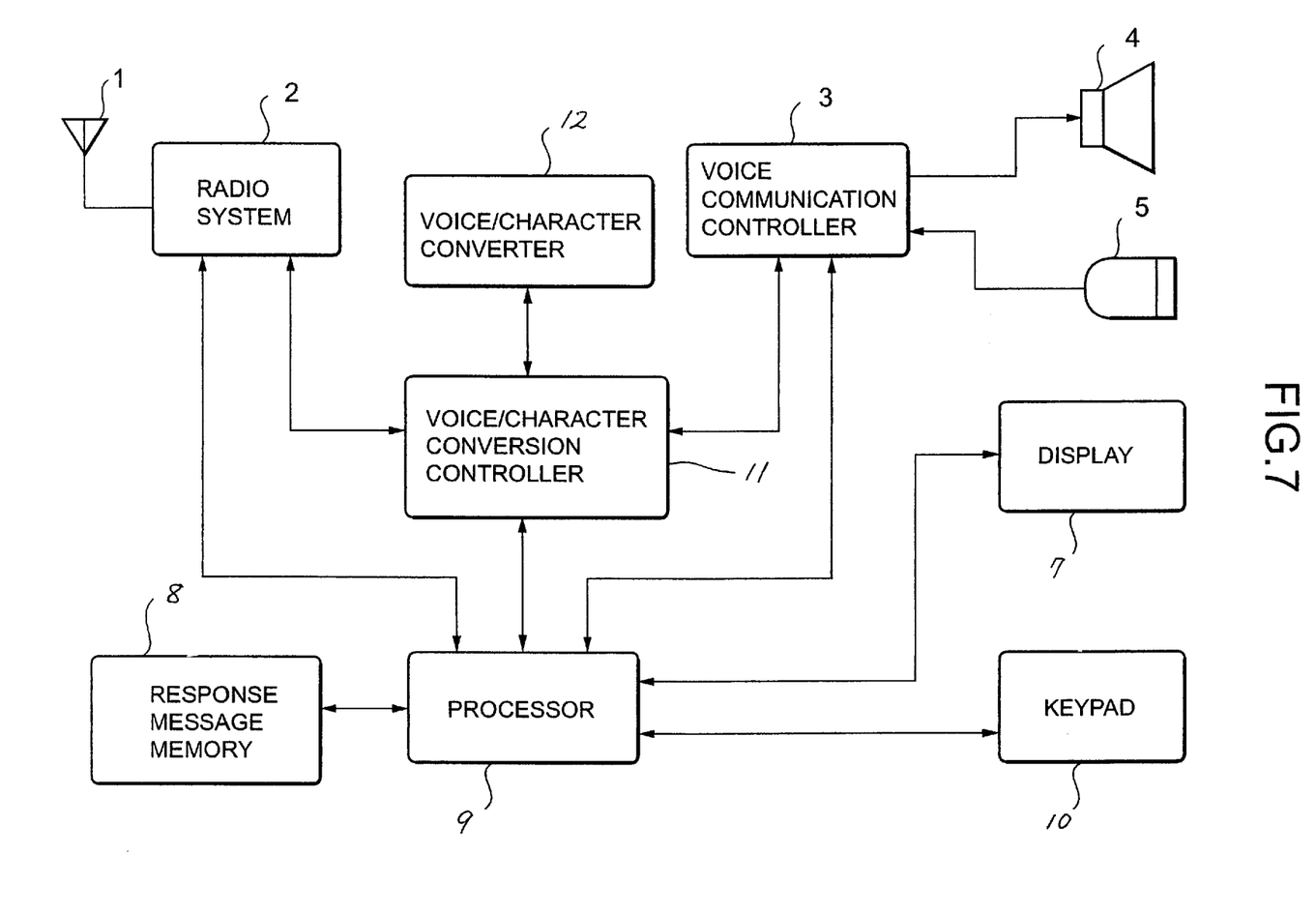
FIG. 7 is a block diagram showing a portable communication apparatus according to a second embodiment of the present invention.

FIG. 7 shows a portable telephone terminal according to a second embodiment of the present invention, where blocks similar to those previously described with reference to FIG. 1 are denoted by the same reference numerals and the details are omitted.

In the second embodiment, a combination of a voice/character conversion controller 11 and a voice/character converter 12 is used in place of the voice/character conversion switch 6 of the first embodiment.

The voice/character converter 12 performs a designated one of a first conversion from voice to character and a second conversion from character to voice depending on control of the voice/character conversion controller 11. Therefore, route setting can be performed without the need of route switches 61, 64 and 65. The entire operation of the combination of the voice/character conversion controller 11 and the voice/character converter 12 is similar to that of the voice/character conversion switch 6 of the first embodiment as shown in FIGS. 2–5.

As described above, according to the present invention, the voice/character conversion direction can be changed by its user, resulting in enhanced convenience to subscribers. Especially, improved communicability between the handicapped and the able-bodied as if to talk by telephone can be achieved.

Further, using the response message memory, a prompt reply of a fixed message can be made during communication, allowing easy input operation and improved convenience. Since a reply message can be sent immediately after a voice or character message has been received, the communication can be made in a form similar to telephone communication.

What is claimed is:

1. A portable communication apparatus comprising:
   a radio system for transmitting and receiving a voice message and a character message to and from a base station in a mobile communications system;
   a voice data processor for voice input and output;
   a character data processor for character data input and output;
   a first converter for converting voice data to character data;
   a second converter for converting character data to voice data;
   a first switch for selecting one of the first converter and the second converter to connect it to the radio system;
   a second switch for selecting one of the voice data processor and the character data processor to connect it to the selected one of the first converter and the second converter, depending on which of a first communication mode and a second communication mode is selected, wherein the first communication mode is such that a voice message received from the base station is converted into character data and a character message to be transmitted is converted into voice data, and the second communication mode is such that a character message received from the base station is converted into voice data and a voice message to be transmitted is converted into character data; and a controller controlling such that the first switch selects one of the first converter and the second converter depending on which of transmission and reception is performed in the selected one of the first communication mode and the second communication mode.

2. The portable communication apparatus according to claim 1, wherein, when the first communication mode is selected, the controller controls the first switch such that the first converter is selected when a voice message is received by the radio system and the second converter is selected when a character message to be transmitted is input from the character data processor.

3. The portable communication apparatus according to claim 1, wherein, when the second communication mode is selected, the controller controls the first switch such that the second converter is selected when a character message is received by the radio system and the first converter is selected when a voice message to be transmitted is input from the voice data processor.

4. The portable communication apparatus according to claim 1, wherein the second switch selects the voice data processor when a non-conversion communication mode is selected depending on a setting instruction, wherein the non-conversion communication mode is such that neither a voice message nor a character message is converted.

5. The portable communication apparatus according to claim 1, further comprising:

a memory for previously storing at least one response character message, wherein the controller controls such that a response character message is read out from the memory depending on an instruction and the second converter converts the response character message to a voice message to be transmitted.

* * * * *